United States Patent
Takahashi et al.

(10) Patent No.: US 7,567,231 B2
(45) Date of Patent: Jul. 28, 2009

(54) DISPLAY DEVICE HAVING DRIVING CIRCUIT

(75) Inventors: Hiroyuki Takahashi, Funabashi (JP); Katsuhiko Yarita, Mobara (JP)

(73) Assignee: Hitachi, Ltd., Tokyo (JP)

( * ) Notice: Subject to any disclaimer, the term of this patent is extended or adjusted under 35 U.S.C. 154(b) by 786 days.

(21) Appl. No.: 11/128,009

(22) Filed: May 12, 2005

(65) Prior Publication Data

US 2005/0205877 A1 Sep. 22, 2005

Related U.S. Application Data

(63) Continuation of application No. 10/243,210, filed on Sep. 13, 2002, now Pat. No. 6,903,717.

(30) Foreign Application Priority Data

Sep. 28, 2001 (JP) ............................ 2001-300738

(51) Int. Cl.
G09G 3/36 (2006.01)
(52) U.S. Cl. .................. 345/100; 345/211; 349/143; 349/149; 349/150; 349/151; 349/152
(58) Field of Classification Search ........... 345/55–107, 345/211; 349/143, 150, 149, 151, 152
See application file for complete search history.

(56) References Cited

U.S. PATENT DOCUMENTS

| | | | | |
|---|---|---|---|---|
| 5,250,931 A * | 10/1993 | Misawa et al. | ............... | 345/206 |
| 5,467,210 A * | 11/1995 | Kishigami | .................. | 349/150 |
| 5,675,397 A * | 10/1997 | Fukushima | .................. | 349/149 |
| 5,680,191 A * | 10/1997 | Voisin et al. | ................. | 349/150 |
| 5,739,887 A * | 4/1998 | Ueda et al. | ................... | 349/149 |
| 5,768,105 A * | 6/1998 | Aota et al. | ................... | 361/777 |
| 5,995,189 A * | 11/1999 | Zhang | ........................ | 349/153 |
| 6,025,901 A * | 2/2000 | Adachi et al. | ............... | 349/151 |
| 6,151,091 A * | 11/2000 | Muramatsu | .................. | 349/149 |
| 6,211,849 B1* | 4/2001 | Sasaki et al. | .................. | 345/55 |
| 6,456,353 B1* | 9/2002 | Chen | .......................... | 349/150 |
| 6,532,055 B2* | 3/2003 | Oishi | .......................... | 349/149 |
| 6,583,844 B1* | 6/2003 | Mishima et al. | ............. | 349/149 |
| 6,729,888 B2* | 5/2004 | Imaeda | ........................ | 439/66 |
| 6,892,694 B2* | 5/2005 | Uchiyama et al. | ........... | 123/294 |
| 7,170,570 B2* | 1/2007 | Kim et al. | ..................... | 349/43 |
| 7,193,623 B2* | 3/2007 | Moon | .......................... | 345/205 |
| 2007/0182691 A1* | 8/2007 | Na | ............................. | 345/100 |

* cited by examiner

Primary Examiner—Bipin Shalwala
Assistant Examiner—Vince E Kovalick
(74) Attorney, Agent, or Firm—Milbank, Tweed, Hadley & McCloy LLP

(57) ABSTRACT

A display device of the present invention has a drain driver mounted to a display substrate and having a gate driver and a controller therein, and also has a power source mounted to a flexible printed board and supplying a power voltage to the gate driver. The wiring of a common control signal outputted from the controller and commonly used in control of the gate driver and the power source is formed on the display substrate so that the number of pads for connecting the display substrate and the flexible printed board is reduced. Thus, the construction of the flexible printed board is simplified, and the entire display device can be made compact.

18 Claims, 10 Drawing Sheets

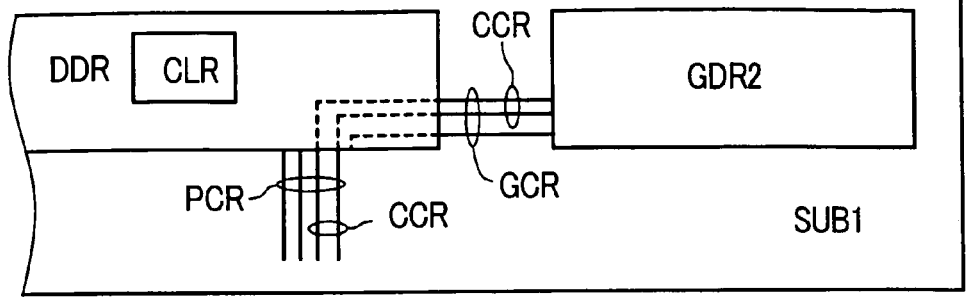
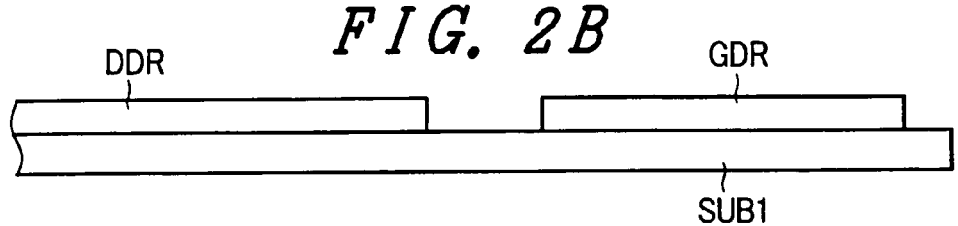
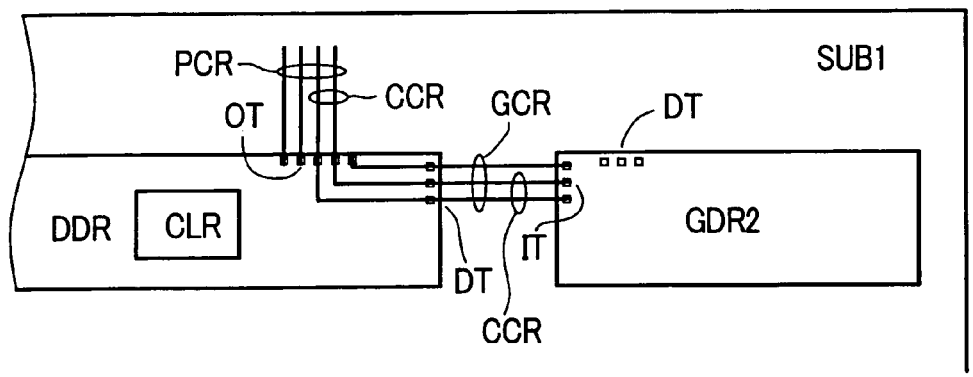
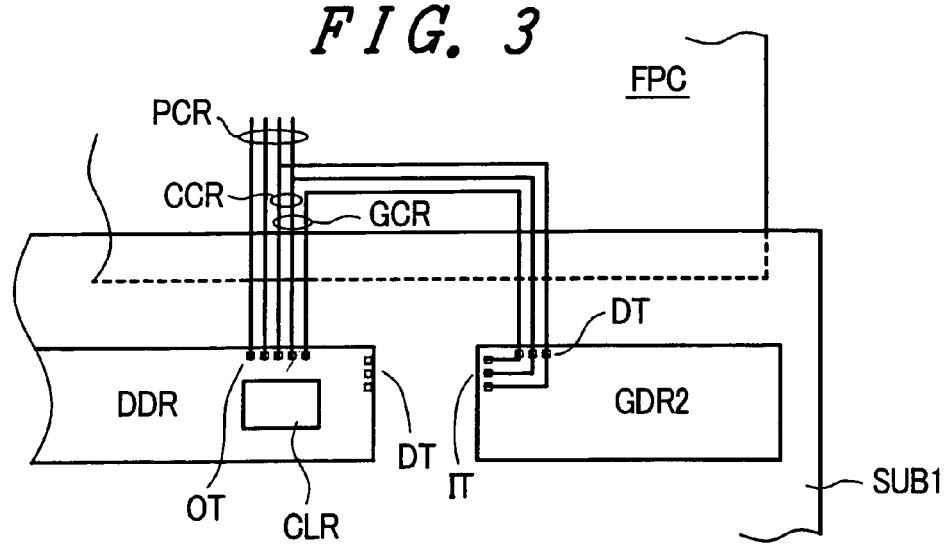

DISPLAY DEVICE HAVING DRIVING CIRCUIT

This application is a continuation of application Ser. No. 10/243,210 filed Sep. 13, 2002 now U.S. Pat. No. 6,903,717, which in turn claims priority to Japan Patent Application No. 2001-300738 filed Sep. 28, 2001.

BACKGROUND OF THE INVENTION

The present invention relates to a display device, and particularly, relates to a display device of a panel type having plural pixels arranged in a matrix shape on a substrate, and a flexible printed board for supplying display data and a predetermined required voltage from a driving circuit chip for operating each of these pixels and an external circuit.

A thin panel type display device light in weight is used as a display device of each of a personal computer, a portable telephone set or a portable information terminal called PDA, etc., and a monitor of each of various kinds of information devices. In this panel type display device, a display device using a liquid crystal panel, a display device using an electroluminescence (EL) panel, a display device using a plasma panel, or a display device using a panel with a carbon nanotube (CNT), etc. as an electronic source, etc. are known.

In the panel type display device of this kind, plural pixels are normally arranged in the matrix shape in the sticking gap of two substrates and are set to a display area. A driving circuit for operating the pixels is generally mounted outside the display area. Driving lines are arranged in one direction of a substrate face and another direction crossing this one direction, and the pixels arranged in the matrix shape are constructed in crossing portions of both the driving lines. There are various constructing methods of the pixels. In these constructing methods, there are a simple matrix method and an active matrix system. In the simple matrix system, superposition of voltage at an intersecting point of both the above driving lines is utilized. In the active matrix system, a switching element is arranged every unit pixel and is selectively lighted.

However, the active matrix system for selectively lightening and displaying the switching element every unit pixel in view of resolution, contrast and operating speed in recent years has become the main current. In the display device of each system, the driving circuit (so-called driver) is arranged outside the display area to supply a driving voltage or a display signal to each driving line. The driver of this kind is normally mounted onto a display substrate or another substrate such as a flexible printed board, etc. connected to the display substrate as a semiconductor chip (driving IC or driving circuit chip).

The display device of the typical active matrix system has a pixel constructed by an optical modulating element such as a liquid crystal, etc. or a light emitting element and a light emitting mechanism in the sticking gap of two substrates. A switching element for pixel selection, a scanning line for applying a scanning voltage of this switching element, a data line for applying display data, a pixel electrode, etc. are formed on the inner face of one substrate. An opposite electrode opposed to the pixel electrode or a color filter, etc. is formed in the other substrate (or the above one substrate). Here, a liquid crystal display device having a thin film transistor TFT widely adopted as the switching element is imaged, and is set to have the construction of a driving circuit chip in the following explanation. In the explanation, the scanning line for applying the above scanning voltage is set to a gate line, and the data line for applying the display data (video signal) is set to a drain line.

FIG. 9 is a typical view for explaining one example of a wiring structure of the liquid crystal display device. In FIG. 9, reference numeral SUB1 designates a first display substrate (corresponding to the above one substrate), and reference numeral SUB2 designates a second display substrate (corresponding to the above other substrate). The outer shape of the first display substrate SUB1 is larger than that of the second display substrate SUB2. The driving circuit such as a drain driver DDR, a gate driver GDR, etc. is mounted to an area projected from the second display substrate SUB2. The drain driver DDR is a driving circuit for supplying a data signal to a drain line DL. A controller CLR for generating and outputting various kinds of control signals for controlling display is built in this drain driver DDR.

The gate driver GDR is a driving circuit for supplying a scanning signal (gate signal) to a gate line GL. The operation of the gate driver GDR is controlled by a gate driver control signal outputted from the controller CLR built in the drain driver DDR. Reference numeral FPC designates a flexible printed board, and a power source IC for supplying electric power to the gate driver GDR is mounted to the flexible printed board FPC. The operation of this power source IC (hereinafter simply called a power source) PWU is controlled by the controller CLR. Further, the power source PWU supplies electric power to the gate driver GDR so that electric power is also supplied to the controller CLR.

Many pads (connecting terminals) for connection to the wirings of the drain driver DDR, the controller CLR or the gate driver GDR and the flexible printed board FPC side are arranged on the lower side of the first display substrate SUB1 in FIG. 9. Further, pads connected to the above pads are also arranged on the upper side of the flexible printed board FPC, and are joined to the wirings of the drain driver DDR, the controller CLR or the gate driver GDR by connecting both the connecting terminals. Wirings corresponding to the wirings of the drain driver DDR and the controller CLR or the gate driver GDR are formed on the first display substrate SUB1.

In FIG. 9, reference numeral PCR designates a power control signal wiring, and reference numeral CCR designates a common control signal wiring for supplying a control signal commonly used in both the power source PWU and the gate driver GDR. Reference numeral GCR designates a gate driver control signal wiring.

In the construction shown in FIG. 9, the width (the transversal direction of FIG. 9) and the length (the longitudinal direction of FIG. 9) of the second display substrate SUB2 are reduced in comparison with the first display substrate. The drain driver DDR having the controller CLR therein is mounted to the first display substrate SUB1 on the lower side in the longitudinal direction. The gate driver GDR is mounted to a rightward transversal portion of the first substrate SUB1. Scanning signals are applied to all gate lines GL from the right-hand transversal side of FIG. 9. The controller CLR can be also constructed by a separate semiconductor chip.

FIG. 10 is a typical view for explaining another example of the wiring structure of the liquid crystal display device. In FIG. 10, the same reference numerals as FIG. 9 correspond to the same function portions. In this constructional example, the width direction sizes of the first display substrate SUB1 and the second display substrate SUB2 are the same width as the first display substrate SUB1. The longitudinal direction lower side of the first display substrate SUB1 is projected, and the drain driver DDR having the controller CLR therein and two gate drivers GDR1 and GDR2 are mounted to this projected side.

As shown in FIG. 9, the gate line GL is vertically divided into two groups in the display area, and the scanning signals are applied to the respective groups from the first gate driver GDR1 and the second gate driver GDR2.

FIG. 11 is a typical view for explaining still another example of the wiring structure of the liquid crystal display device. In FIG. 11, the same reference numerals as FIGS. 9 and 10 correspond to the same function portions. In this constructional example, the width direction sizes of the first display substrate SUB1 and the second display substrate SUB2 are the same width as the first display substrate SUB1. The longitudinal direction lower side of the first display substrate SUB1 is projected, and the drain driver DDR having the controller CLR therein is mounted to this projected side.

The gate driver GDR having the power source PWU therein is mounted to the flexible printed board FPC. Similar to FIG. 10, the gate line GL is vertically divided into two groups in the display area. The scanning signals are supplied to the respective groups from the gate driver GDR mounted to the flexible printed board PFC.

A gate driver control signal and a power control signal are inputted to the gate driver GDR having the power source PWU therein through the illustrated gate driver control signal wiring GCR. These signals also include a common control signal used in control of the gate driver GDR and the power source PWU.

The flow of the control signal in FIGS. 9 to 11 will next be explained. The controller CLR outputs a signal for controlling the operation of the gate driver GDR, e.g., a pulse (CL1) of one line period, a frame head pulse (FLM), a display timing signal (DISPTMG) showing timing of gate-off, etc. These outputs are inputted to the gate driver GDR. These control signals are omitted in FIGS. 9 to 11.

The controller CLR outputs a signal for controlling the operation of the power source PWU, e.g., a clock for raising voltage (DCCLK not shown in FIGS. 9 to 11), etc. This output is inputted to the power source PWU through a connection point (pad) of the first display substrate SUB1 and the flexible printed board FPC.

Further, the controller CLR outputs a common control signal commonly used to control the operations of the gate driver GDR and the power source PWU to the common control signal wiring CCR. The signal of this kind is inputted to the power source PWU through the connection point of the first display substrate SUB1 and the flexible printed board FPC, and is inputted to the gate driver GDR as it is with respect to FIG. 11. The signal of this kind is also once transmitted to the flexible printed board FPC through the connection point with respect to FIGS. 9 and 10, and is branched to the wirings of separate layers at the point of a through hole and is then again returned to the display substrate SUB1 through a separate connection point, and is inputted to the gate driver GDR (GDR1, GDR2).

In the construction of the display device explained with reference to FIG. 9, the gate driver GDR and the drain driver DDR are respectively mounted to the rightward transversal direction side and the downward longitudinal direction side of the first display substrate SUB1 constituting this display device. Therefore, the transversal width of the display device is increased to secure each wiring space of input and output of the gate line GL so that the trim size in the transversal direction is enlarged and the display area is located in a position shifted in the leftward direction from the center. This problem is also similarly caused when the gate driver GDR is mounted to the leftward transversal side of the first display substrate SUB1.

Further, the gate control signal supplied from the controller CLR to the gate driver GDR, and the common control signal commonly used in the control of the power source PWU and the gate driver GDR must be transmitted through the wiring of the flexible printed board FPC. Therefore, the number of pads arranged in the first display substrate SUB1 and the flexible printed board FPC is increased so that the width of the flexible printed board FPC is inevitably increased. Further, since these signal wirings cross each other on the flexible printed board FPC, it is necessary to wire these signal wirings to a separate layer by using a through hole.

In the display device of the construction explained with reference to FIG. 10, since the gate driver GDR is mounted to the lower side (downward longitudinal direction side) of the first display substrate SUB1, no trim size is enlarged in comparison with the trim size shown in FIG. 9. However, similar to FIG. 9, the number of pads arranged in the first display substrate SUB1 and the flexible printed board FPC is increased so that the width of the flexible printed board FPC is inevitably increased.

In the display device of the construction explained with reference to FIG. 11, no problem of the increase in the number of pads for the gate control signal and the common control signal as in FIGS. 9 and 10 is caused.

However, a pad for the gate line GL is required. This pad number is very large in comparison with the increase in the number of pads for the gate control signal so that the width of the flexible printed board FPC is increased.

SUMMARY OF THE INVENTION

Present invention is able to provide a display device simplifying the wiring between the controller CLR, the gate driver GDR and the power source PWU, and the wiring of the flexible printed board FPC, and reducing the number of pads for connecting both the wirings.

A display device comprises a display substrate arranging plural pixels therein, a gate driver for outputting a scanning signal for scanning said pixels, a power source IC for supplying electric power to said gate driver, a controller for controlling operations of the gate driver and the power source IC, and a flexible printed board connected to the display substrate;

wherein the gate driver and the controller are arranged on the display substrate;

the power source IC is arranged outside the display substrate and supplies electric power to the gate driver through the flexible printed board;

the controller has an output terminal for outputting a common control signal commonly used in control of the gate driver and the power source IC;

the display substrate has wirings divided and pulled out in two directions in the place of the output terminal of the common control signal; and the common control signal is drawn around and inputted to the gate driver by the wirings on the display substrate, and is inputted to the power source IC through the wirings on the display substrate and the flexible printed board.

BRIEF DESCRIPTION OF THE DRAWINGS

FIGS. 2A-2C are a typical views for explaining the construction of a main portion of a first display substrate.

FIG. 3 is a typical view for explaining the construction of a main portion of the first display substrate in the wiring construction of a display device for explaining a second embodiment of the present invention.

DESCRIPTION OF THE PREFERRED EMBODIMENTS

Figure 1:
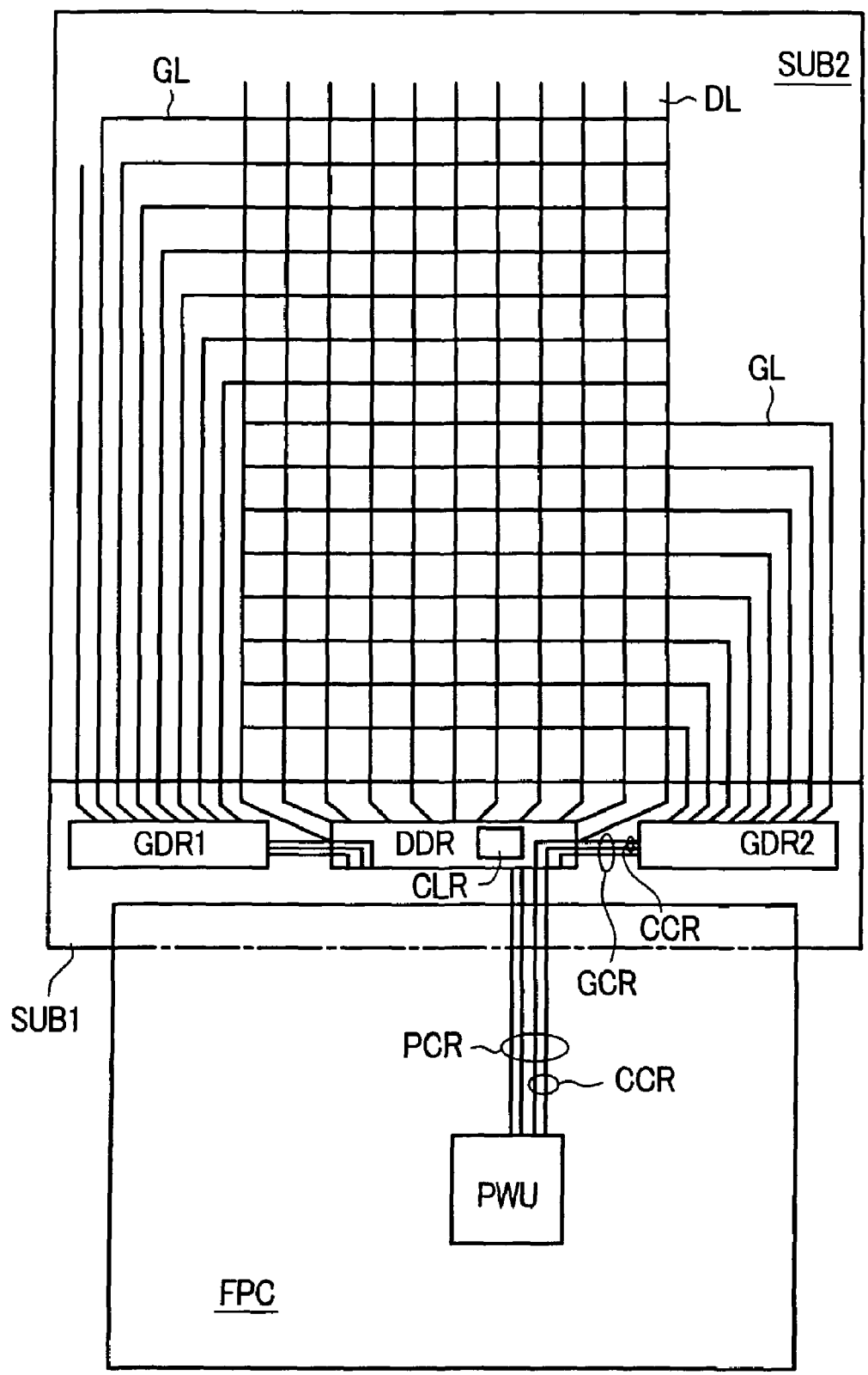
FIG. 1 is a typical view for explaining the wiring construction of a display device for explaining a first embodiment of the present invention.

The present invention simplifies the wiring of the flexible printed board by directly arranging wiring on one display substrate constituting the display device, and reduces the number of connection wirings between the display substrate and the flexible printed board. The typical construction of the present invention is described as follows.

(1) A display device comprises a display substrate arranging plural pixels therein, a gate driver for outputting a scanning signal for scanning said pixels, a power source IC for supplying electric power to said gate driver, a controller for controlling operations of said gate driver and said power source IC, and a flexible printed board connected to said display substrate;

wherein said gate driver and said controller are arranged on said display substrate;

said power source IC is arranged outside said display substrate and supplies electric power to said gate driver through said flexible printed board;

said controller has an output terminal for outputting a common control signal commonly used in control of the gate driver and the power source IC;

said display substrate has wirings divided and pulled out in two directions in the place of said output terminal of said common control signal; and said common control signal is drawn around and inputted to said gate driver by said wirings on said display substrate, and is inputted to said power source IC through said wirings on said display substrate and said flexible printed board.

(2) In the above (1), the wiring of said common control signal passes below a chip having said controller in one of said two directions, and is pulled out bypassing a side different from the arranging side of said output terminal of said chip.

(3) In the above (2), the wiring passing below the chip having said controller and pulled out by passing the side different from the arranging side of said output terminal of said chip is connected to said gate driver.

(4) In the above (2), the wiring passing below the chip having said controller and pulled out by passing the side different from the arranging side of, said output terminal of said chip is connected to said power source IC through said flexible printed board.

The number of terminals to be connected between the display substrate and the flexible board can be reduced by the constructions (1) to (4). Further, the output terminal of the common control signal arranged in the controller built in the drain driver is commonly used in the drain driver and the power source IC without arranging one dedicated terminal in each of the drain driver and the power source. Accordingly, the number of output terminals from the controller (drain driver) is reduced, and the interior of the controller is easily designed. Further, it is possible to simultaneously achieve the effect of uncrossing another wiring (the wiring of another common control signal or the wiring of another signal).

(5) In one of the above (2) to (4), the wiring passing below the chip having said controller and pulled out by passing the side different from the arranging side of said output terminal of said chip is pulled out via a dummy terminal.

(6) In one of the above (1) to (5), said common control signal is two or more signals.

Cross of the common control signal wirings can be also removed even in the construction of the above (6).

(7) In one of the above (1) to (6), said controller is built in a drain driver for outputting a video signal to said pixel. However, this controller can be also set to a separate semiconductor chip.

(8) In one of the above (1) to (7), said display device is a liquid crystal display device.

(9) A display device comprises a display substrate arranging plural pixels therein, a gate driver for outputting a scanning signal for scanning said pixels, a power source IC for supplying electric power to said gate driver, a controller for controlling operations of said gate driver and said power source IC, and a flexible printed board connected to said display substrate;

wherein said gate driver and said controller are arranged on said display substrate;

said power source IC is arranged outside said display substrate and supplies electric power to said gate driver through said flexible printed board;

said controller has an output terminal for outputting a common control signal commonly used in control of the gate driver and the power source IC, and a dummy terminal arranged on a side adjacent to the arranging side of said output terminal; and said gate driver has an input terminal for inputting said common control signal, and a dummy terminal arranged on a side adjacent to the arranging side of said input terminal.

(10) In the above (9), said dummy terminal of said controller is arranged on a short side of said controller, and the dummy terminal of said gate driver is arranged on a long side of said gate driver.

(11) In the above (9), said dummy terminal of said controller is arranged on a short side of said controller, and the dummy terminal of said gate driver is arranged on a short side of said gate driver.

(12) In the above (9), said dummy terminal of said controller is arranged on a long side of said controller, and the dummy terminal of said gate driver is arranged on a long side of said gate driver.

(13) In the above (9), said dummy terminal of said controller is arranged on a long side of said controller, and the dummy terminal of said gate driver is arranged on a short side of said gate driver.

(14) In one of the above (9) to (13), said common control signal is wired at least once via the dummy terminal of said controller or said gate driver.

(15) In one of the above (9) to (14), said common control signal is drawn around and inputted to said gate driver by wiring on said display substrate, and is inputted to said power source IC through the wiring on said display substrate and said flexible printed board.

(16) In one of the above (9) to (15), said common control signal is two or more signals.

(17) In one of the above (9) to (16), said controller is built in a drain driver for outputting a video signal to said pixel. However, this controller can be also set to a separate semiconductor chip.

Figure 10:
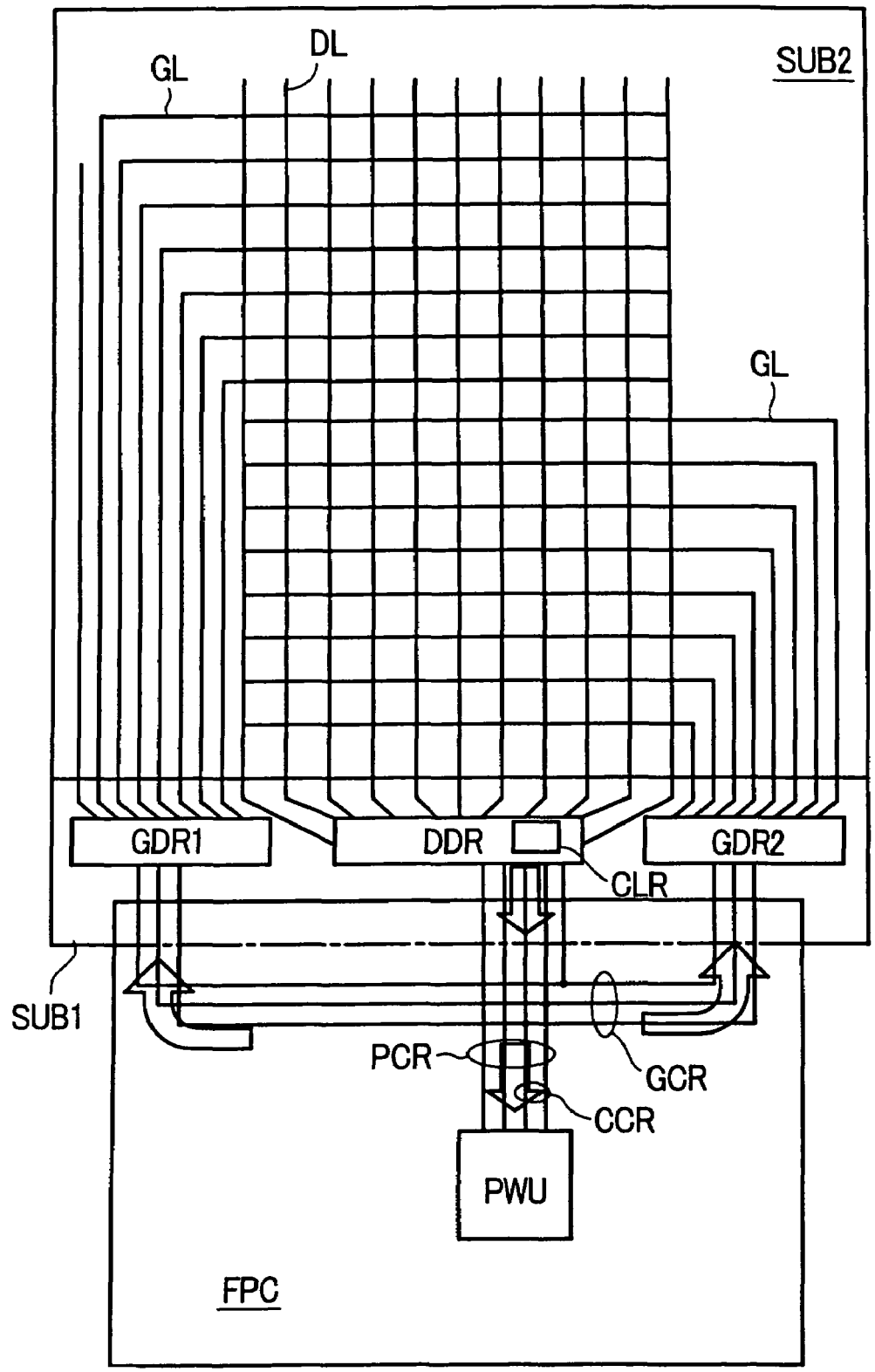
FIG. 10 is a typical view for explaining another example of the wiring structure of the liquid crystal display device.
Figure 11:
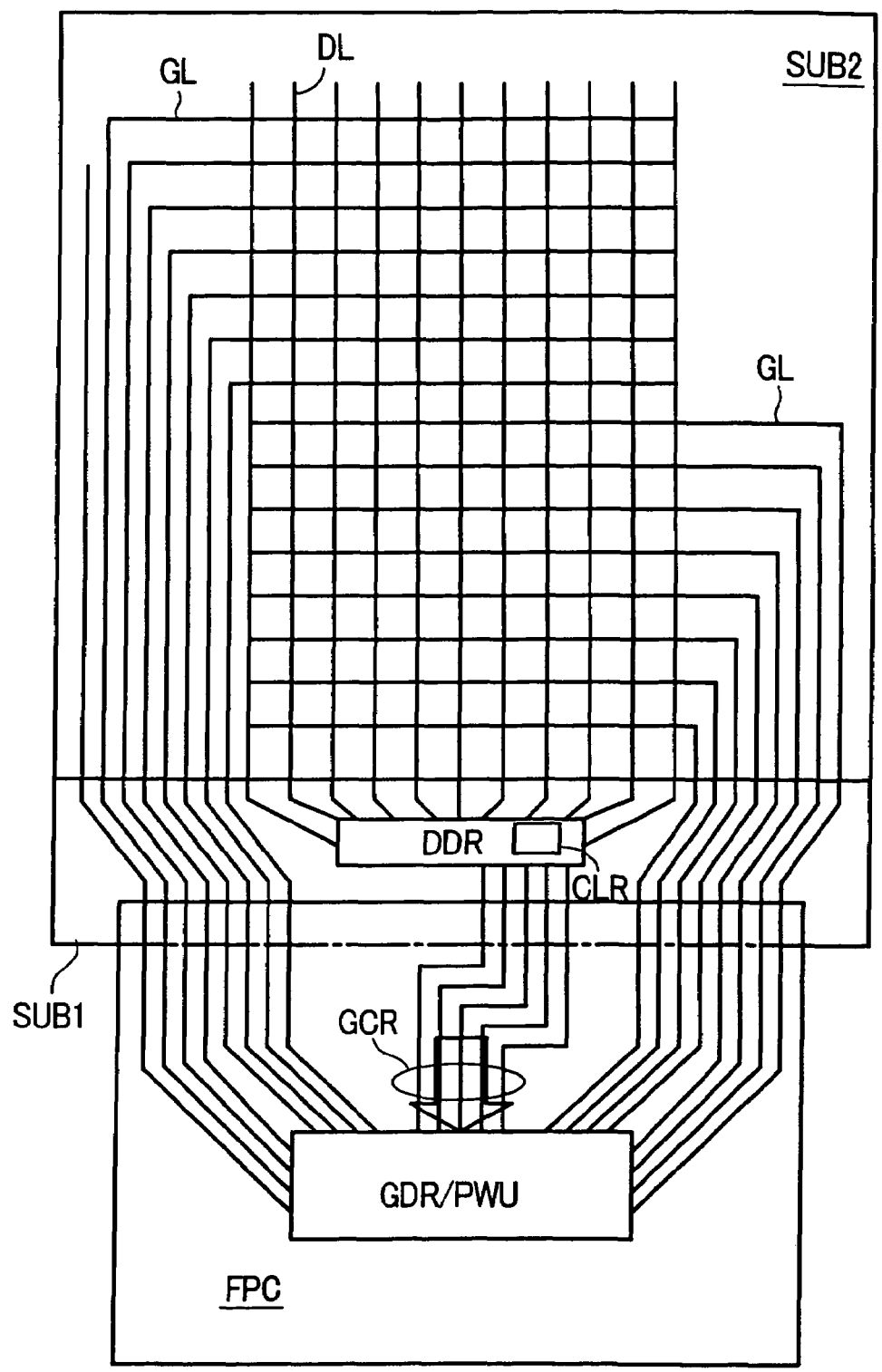
FIG. 11 is a typical view for explaining still another example of the wiring structure of the liquid crystal display device.

In accordance with the above constructions (9) to (14), the display device can be constructed by using the gate driver and the controller (drain driver) commonly usable in any one of two systems constructed by a system for reducing the number of terminals between the display substrate and the flexible printed board FPC by directly connecting the gate driver and the controller (built in the drain driver) without transmitting at least one portion of a gate control signal (a control signal for only gate control and a common control signal) via the flexible printed board FPC as in (1) and (15), and a system for connecting the gate driver and the controller by transmitting at least one portion of the gate control signal (a control signal for only gate control and a common control signal) via the flexible printed board FPC as in FIG. 10. Namely, the same driver can be used in any one of the above two systems so that the display device has high general purpose property.

(18) In one of the above (9) to (17), said display device is a liquid crystal display device.

The present invention is not limited to the above construction and the constructions of embodiments described later, but can be variously changed without departure from the technical idea of the present invention.

The embodiment modes of a display device in the present invention will next be explained in detail with reference to the drawings of the embodiments. FIG. 1 is a typical view for explaining the wiring construction of the display device for explaining a first embodiment of the present invention. In FIG. 1, reference numeral SUB1 designates a first display substrate, and reference numeral SUB2 designates a second display substrate. The transversal direction size of the first display substrate SUB1 is the same as the second display substrate SUB2. A drain driver DDR, a first gate driver GDR1 and a second gate driver GDR2 are mounted to a lower, side area of the first display substrate SUB1 projected from the second display substrate SUB2.

The drain driver DDR is a driving circuit for supplying a data signal to a drain line DL. A controller CLR for generating and outputting various kinds of control signals for controlling the operations of a gate driver GDR and a power source PWU is built in this drain driver DDR. The gate line GL is vertically divided into two groups in a display area.

The first gate driver GDR1 and the second gate driver GDR2 are driving circuits for supplying gate signals to the respective divided groups of the gate line GL from the leftward and rightward directions. The operations of the first gate driver GDR1 and the second gate driver GDR2 are controlled by a gate driver control signal outputted from the controller CLR built in the drain driver DDR. The gate driver control signal is supplied to each gate driver by a gate driver control signal wiring GCR directly wired on the first substrate SUB1.

The power source PWU for supplying electric power to the gate driver GDR is mounted to the flexible printed board FPC. The operation of this power source PWU is controlled by a power control signal from the controller CLR. Since the gate driver control signal wiring GCR from the drain driver DDR to the gate drivers GDR1, GDR2 is pulled out of the ventral of the drain driver DDR, this ventral portion is hidden, but is shown by a solid line in FIG. 1 to easily understand the ventral portion.

In this embodiment, the power source PWU is arranged in the flexible printed board FPC, but is not limited to this flexible printed board FPC. The power source PWU may be also arranged in a separate substrate, and this substrate and the display substrate SUB1 may be also connected to each other through the flexible printed board FPC. In any case, the power source PWU supplies electric power to the gate driver GDR through the flexible printed board FPC. The power source PWU also supplies electric power to the drain driver DDR (and the controller CLR). These explanations are similar in the subsequent embodiments.

FIGS. 2A-2C are a typical views for explaining the construction of a main portion of a first display substrate. FIG. 2B shows an end edge view in which the first display substrate is seen from the lower side of the display device. FIG. 2A shows a top view (mounting face of the driver) of FIG. 2B, and FIG. 2C shows a rear view (face opposed to the mounting face of the driver) of FIG. 2B. FIGS. 2A-2C correspond to portions of the second gate driver GDR2 and the drain driver DDR mounted to the right-hand side of the first display substrate SUB1 in FIG. 1. The wiring between the first gate driver GDR1 and the drain driver DDR is the same except for a wiring connected to the power source. Accordingly, only the second gate driver GDR2 will be explained here.

Reference numeral PCR, CCR and GCR respectively designate a power control signal wiring, a common control signal wiring for supplying a control signal to both the power source PWU and the gate driver GDR, and a gate driver control signal wiring. The gate driver control signal wiring GCR is wired onto the first substrate SUB1. A pad is bridged between the power control signal wiring PCR and the flexible printed board FPC, and the power control signal wiring PCR is connected to the power source PWU through the wiring of the flexible printed board FPC. Both the gate driver control signal wiring GCR and the power control signal wiring PCR have the common control signal wiring CCR.

Four wirings on the left-hand side pulled out of an output terminal OT arranged on the long side of the drain driver DDR among control signal wirings directly wired to the first display substrate SUB1 are power control signal wirings PCR. Two wirings on the right-hand side among these four wirings are common control signal wirings CCR. This common control signal wiring CCR is divided and pulled out in two directions in the place of the output terminal. One common control signal wiring CCR reaches the power source PWU through a pad, and the other common control signal wiring CCR reaches an input terminal IT arranged on the short side of the second gate driver GDR2 via a dummy terminal DT arranged on the short side of the drain driver DDR. Three wirings including one wiring on the rightmost side are gate driver control signal wirings GCR, and reach the input terminal IT on the short side of the second gate driver GDR2 via the dummy terminal DT arranged on the short side of the drain driver DDR. The numbers of gate driver control signal wirings GCR, power control signal wirings PCR and common control signal wirings CCR are not limited to these examples. These numbers are similarly not limited in the subsequent embodiments.

Many unillustrated pads for connection to the wirings of the drain driver DDR, the controller CLR or the gate driver GDR and the flexible printed board FPC side are arranged on the lower side of the first display substrate SUB1 in FIGS. 2A-2C. Further, unillustrated pads connected to the above pads are arranged on the upper side of the flexible printed board FPC, and are joined to the wirings of the drain driver DDR, the controller CLR or the first gate driver GDR1 and the second gate driver GDR2 by connecting both the connecting pads. Wirings corresponding to the wirings of the drain driver DDR, the controller CLR or the first gate driver GDR1 and the second gate driver. GDR2 are formed on the first display substrate SUB1.

For example, there are a signal for setting operating modes of the gate drivers GDR1, GDR2 and the power source PWU, etc. in the common control signal commonly used to control the operations of the gate driver GDR and the power source PWU. For example, this signal has a chip select signal (GCS), a transfer clock (GCL) and a data signal (GDA).

Here, setting of the operating mode of the display device in this embodiment will be explained. The chip select signal (GCS) is a signal showing start and termination of the setting of the operating mode. After the chip select signal (GCS) shows the start of the setting of the operating mode, the data signal (GDA) is serially transferred from the controller CLR to the gate driver (GDR1, GDR2) and the power source IC in synchronization with the transfer clock (GCL). When the chip select signal (GCS) shows the termination of the setting, the transfer is terminated. In the gate driver (GDR1, GDR2) and the power source IC, the operating mode is set in accordance with transferred data.

For example, the data serially transferred by the data signal (GDA) are constructed by data of 16 bits, and upper three bits are set to an index code, and lower 13 bits are set to instruction data. The index code is data showing an item to be set, and each bit of the instruction data shows its set value.

For example, when the index code is "110", a lower eleventh bit of the instruction data is set to the scanning direction of the gate driver GDR (GDR1, GDR2). When this bit is "0", the operation is performed in the forward direction. In contrast to this, when this bit is "1", the operation is performed in the reverse direction. At this time, the same data are also transferred to the power source PWU, but this setting has no meaning in the power source PWU. Therefore, the power source PWU neglects this setting.

On the other hand, for example, when the index code is "001", the instruction data become data showing the setting of amplification factors of various kinds of voltages of the power source PWU, etc. In this case, in the gate driver GDR (GDR1, GDR2), this setting has no meaning. Therefore, the gate driver GDR (GDR1, GDR2) neglects this setting.

When the index code is "000", the lower first bit of the instruction data shows the setting of a sleep mode. When this bit is "1", the gate driver GDR (GDR1, GDR2) sets all the gate lines GL to a ground output, and the power source PWU stops the operation of a power source circuit. In this case, the setting is performed with respect to both the gate driver GDR (GDR1, GDR2) and the power source PWU.

These signals are provided as one example. Accordingly, another signal may be also used if this signal is a control signal commonly used to control the operations of the gate driver GDR (GDR1, GDR2) and the power source IC.

FIG. 3 is a typical view for explaining the construction of a main portion of the first display substrate in the wiring construction of the display device for explaining a second embodiment of the present invention. FIG. 3 corresponds to a view in which portions of the second gate driver GDR2 and the drain driver DDR mounted to the right-hand side of the first display substrate SUB1 in FIG. 1 are seen from the rear face of the first display substrate SUB1.

In this embodiment, a power control signal wiring PCR and a common control signal wiring CCR reach an unillustrated power source PWU mounted to the flexible printed board FPC from an output terminal OT arranged on the long side of the drain driver DDR. The common control signal wiring CCR and the gate driver control signal wiring GCR are again returned to the first display substrate SUB1 from the flexible printed board FPC, and are connected to an input terminal IT arranged on the short side via a dummy terminal DT arranged on the long side of the gate driver GDR.

A chip having the terminal IT of the gate driver GDR not opposed to the output terminal OT of the drain driver DDR can be also used by using each of these wirings. Further, the wirings of two systems can be also performed by using the same driver as FIG. 2 so that the driver can be commonly used.

Figure 4A:
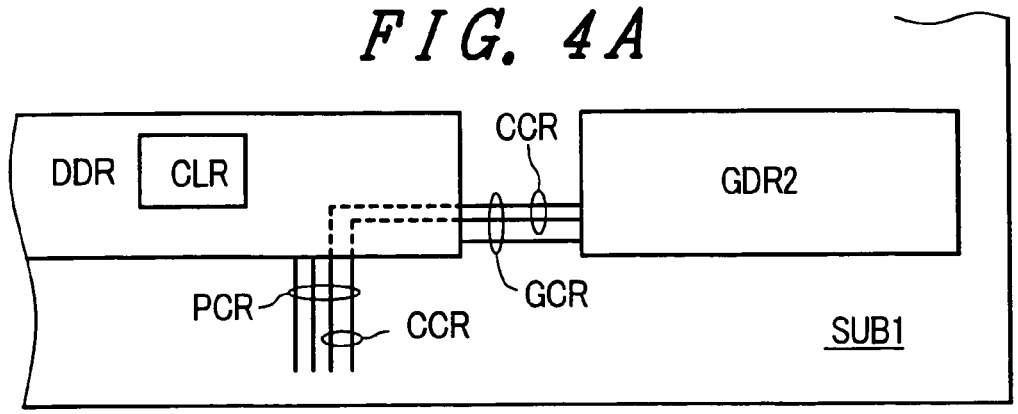
FIGS. 4A-4C are typical views for explaining the construction of a main portion of the first display substrate in the wiring construction of a display device for explaining a third embodiment of the present invention.
Figure 4B:
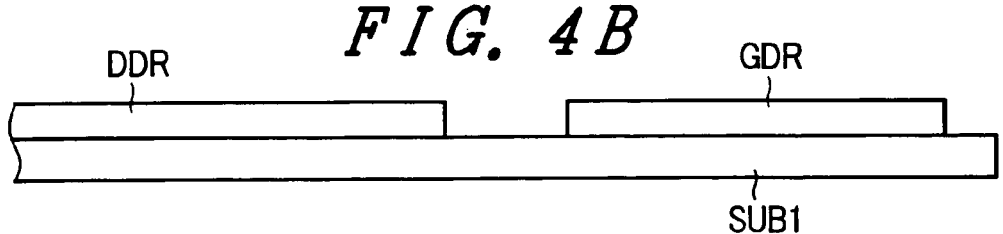
Figure 4C:
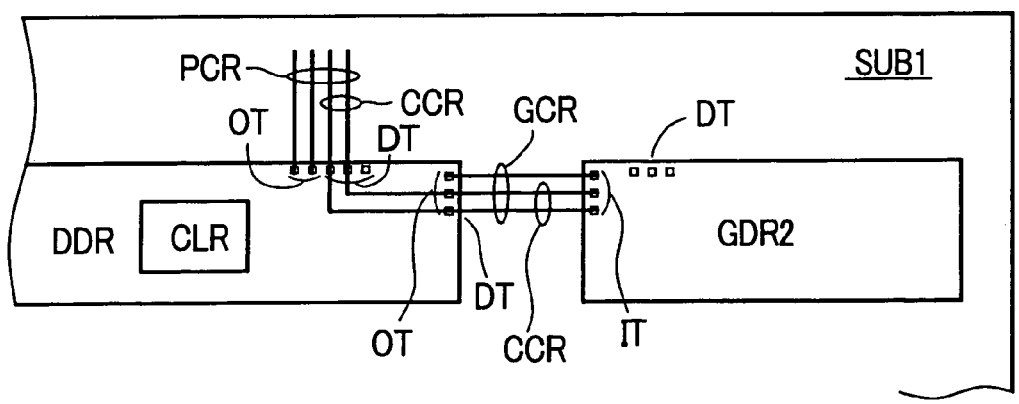

FIGS. 4A-4C are typical views for explaining the construction of a main portion of the first display substrate in the wiring construction of a display device for explaining a third embodiment of the present invention. FIG. 4B shows an end edge view in which the first display substrate is seen from the lower side of the display device. FIG. 4A shows a top view (mounting face of the driver) of FIG. 4B. FIG. 4C shows a rear view (face opposed to the mounting face of the driver) of FIG. 4B. FIGS. 4A-4C correspond to portions of the second gate driver GDR2 and the drain driver DDR mounted to the right-hand side of the first display substrate SUB1 in FIG. 1.

FIGS. 4A-4C differ from FIGS. 2A-2C in that the output terminal OT of the common control signal is arranged on the short side of the drain driver DDR, and the common control signal wiring CCR is connected to the power source PWU via a dummy terminal DT arranged on the long side.

With respect to the gate driver control signal, the output terminal OT is arranged on the short side, and its dummy terminal DT is arranged on the long side. In this case, since the output terminal OT is opposed to the input terminal IT of the gate driver GDR2, there is an advantage in that wiring can be shortened. The explanation of the other portions overlapped with the explanation of FIG. 2 is omitted.

In this embodiment, the wiring as shown in FIG. 3 can be also performed and the driver can be commonly used in two systems.

Figure 5A:
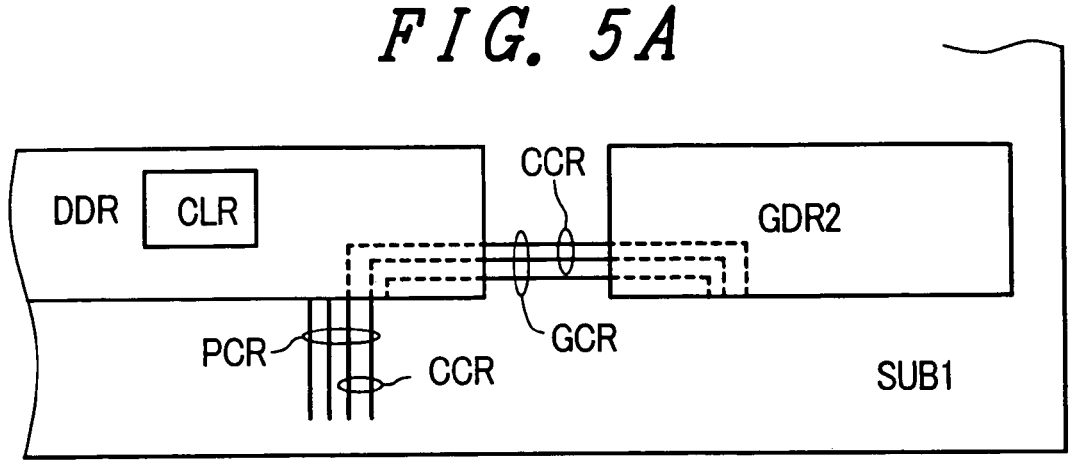
FIGS. 5A-5C are typical views for explaining the construction of a main portion of the first display substrate in the wiring construction of a display device for explaining a fourth embodiment of the present invention.
Figure 5B:
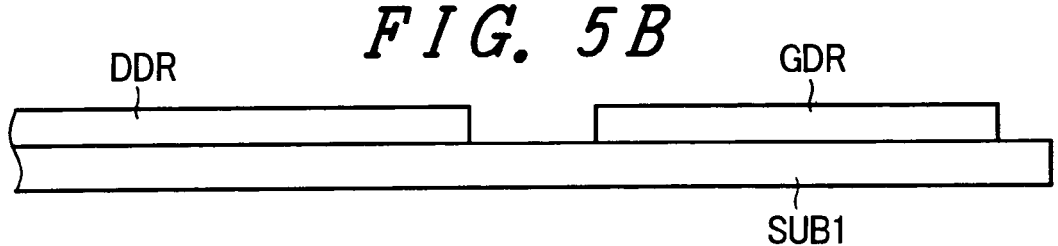
Figure 5C:
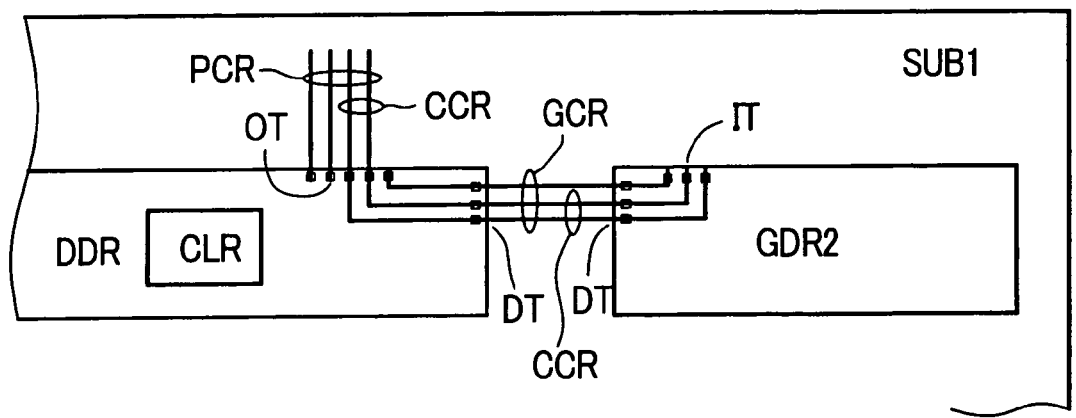

FIGS. 5A-5C are typical views for explaining the construction of a main portion of the first display substrate in the wiring construction of a display device for explaining a fourth embodiment of the present invention. FIG. 5B shows an end edge view in which the first display substrate is seen from the lower side of the display device. FIG. 5A shows a top view (mounting face of the driver) of FIG. 5B. FIG. 5C shows a rear view (face opposed to the mounting face of the driver) of FIG. 5B.

FIGS. 5A-5C correspond to portions of the second gate driver GDR2 and the drain driver DDR mounted to the right-hand side of the first display substrate SUB1 in FIG. 1.

FIGS. 5A-5C differ from FIGS. 2A-2C in that the input terminal IT of the gate driver control signal and the common control signal are arranged on the long side of the gate driver GDR2, and these dummy terminals DT are arranged on the short side. The common control signal wiring CCR is connected to the input terminal IT arranged on the long side of the gate driver GDR2 via the two dummy terminals DT on the lower side of FIG. 5C on the short side of the drain driver DDR, and the dummy terminal DT arranged on the short side of the gate driver GDR2 through the wiring on the first display substrate SUB1.

The gate driver control signal wiring GCR is connected to the input terminal IT arranged on the long side of the gate driver GDR2 from an output terminal OT arranged on the long side of the drain driver DDR via the dummy terminal DT arranged on the short side of the drain driver DDR, and the dummy terminal DT arranged on the short side of the gate driver GDR2 through the wiring on the first display substrate SUB1. The explanation of the other portions overlapped with the explanation of FIGS. 2A-2C is omitted.

In this embodiment, the wiring as shown in FIG. 3 can be also performed and the driver can be commonly used in two systems.

Figure 6A:
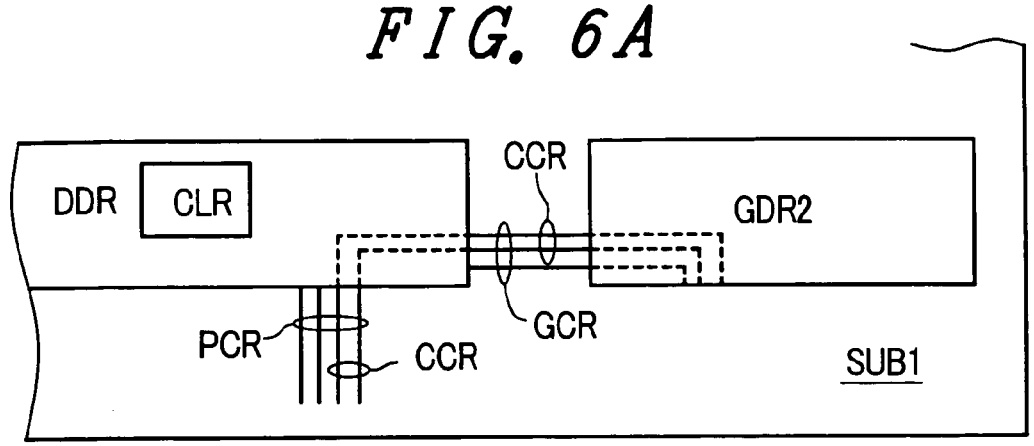
FIGS. 6A-6C are typical views for explaining the construction of a main portion of the first display substrate in the wiring construction of a display device for explaining a fifth embodiment of the present invention.
Figure 6B:
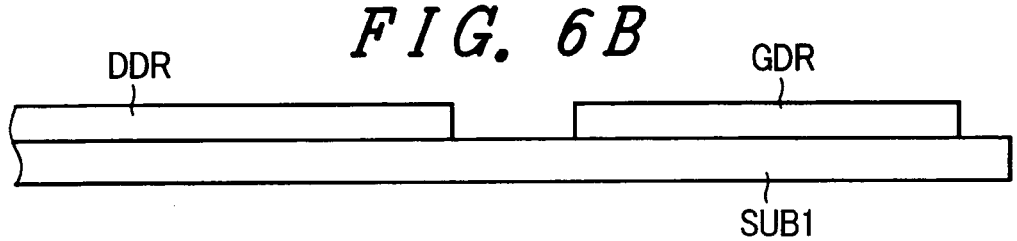
Figure 6C:
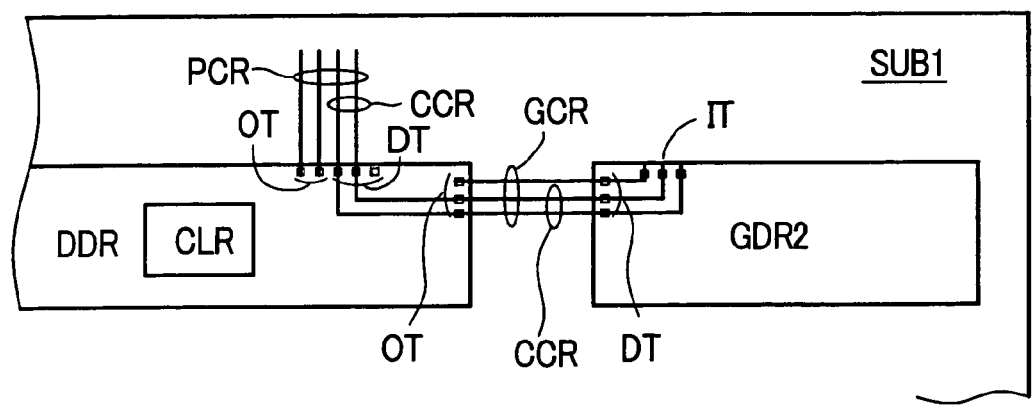

FIGS. 6A-6C are typical views for explaining the construction of a main portion of the first display substrate in the wiring construction of the display device for explaining a fifth embodiment of the present invention. FIG. 6B shows an end edge view in which the first display substrate is seen from the lower side of the display device. FIG. 6A shows a top view (mounting face of the driver) of FIG. 6B. FIG. 6C shows a rear view (face opposed to the mounting face of the driver) of FIG. 6B.

FIGS. 6A-6C correspond to portions of the second gate driver GDR2 and the drain DDR mounted to the right-hand side of the first display Substrate SUB1 in FIG 1.

FIGS. 6A-6C differ from FIGS. 5A-5C in that the output terminal OT of the common control signal is arranged on the short side of the drain driver DDR, and the common control signal wiring CCR is connected to the power source PWU via the dummy terminal DT arranged on the long side. With respect to the gate driver control signal, an output terminal DT is also arranged on the short side, and its dummy terminal DT is arranged on the long side. The explanation of the other portions overlapped with the explanation of FIGS. 5A-5C is omitted.

In this embodiment, the wiring as shown in FIG. 3 can be also performed and the driver can be commonly used in two systems.

Thus, the wiring of the flexible printed board FPC can be simplified by transmitting one portion of various kinds of signals supplied to the gate driver GDR through the wiring on the first display substrate SUB1 by the above construction of each embodiment so that the number of pads for connecting both can be reduced. One example of another wiring structure of the present invention will next be explained.

Figure 7:
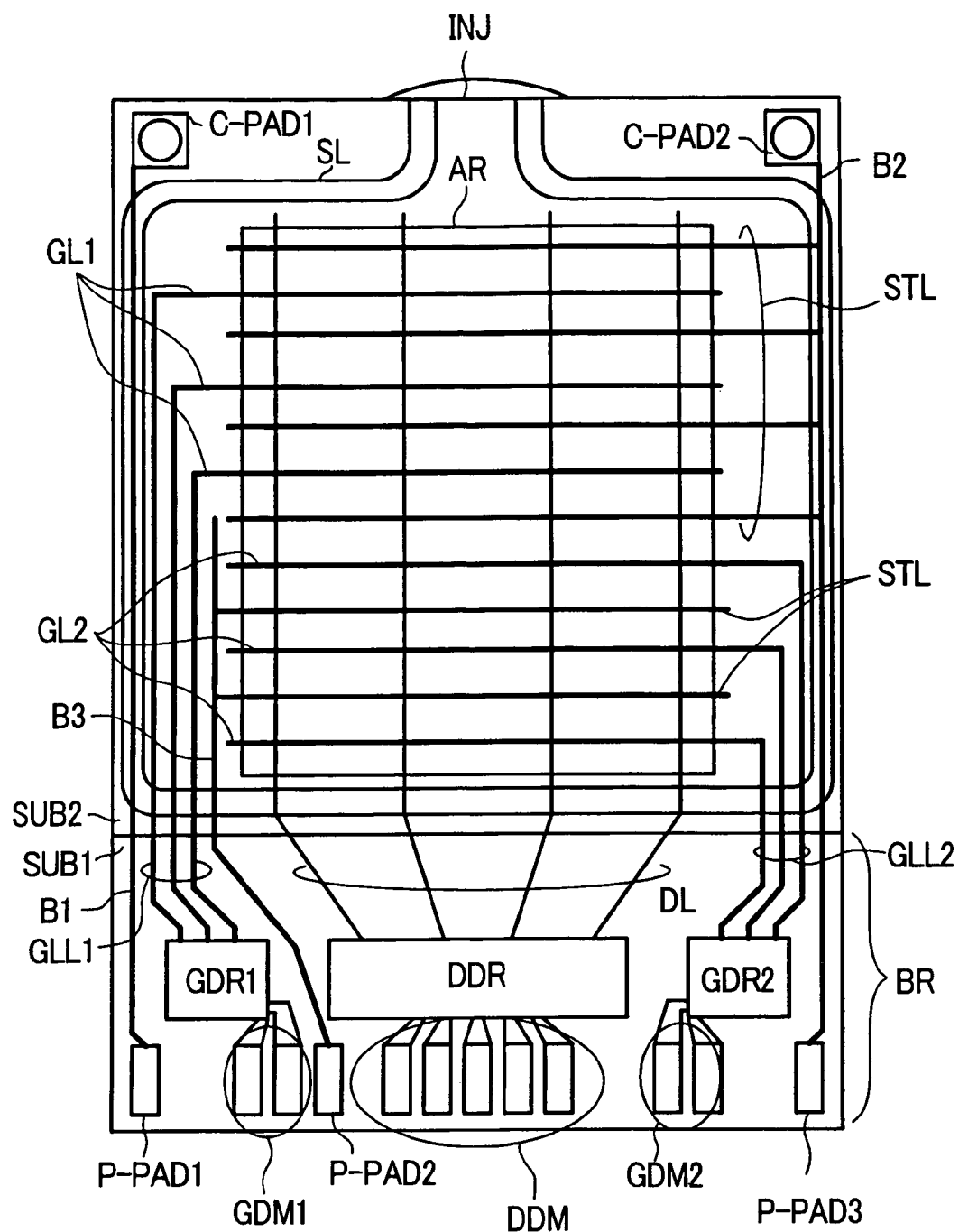
FIG. 7 is a typical plan view for explaining a wiring structure example of a display area when the present invention is applied to a liquid crystal display device.

FIG. 7 is a typical plan view for explaining an example of the wiring structure of a display area when the present invention is applied to a liquid crystal display device. In this liquid crystal display device, a first display substrate SUB1 and a second display substrate SUB2 are stuck to each other, and an unillustrated liquid crystal is sealed between both the display substrates so that a display area AR is formed. The circumference of the display area AR is sealed by a sealant SL. Reference numeral INJ designates a liquid crystal seal port. After the liquid crystal is sealed between both the substrates, the liquid crystal is closed by the sealant. One side (the lower side of FIG. 1) of the first display substrate SUB1 is projected from the second display substrate SUB2, and this projecting portion becomes a driving circuit mounting area BR.

A drain driver DDR and two gate drivers (first gate driver GDR1 and second gate driver GDR2) are mounted to this driving circuit mounting area BR. A controller CLR for controlling display is built in the drain driver DDR. An input terminal DDM of the drain driver DDR, input terminals GDM1, GDM2 of the first gate driver GDR1 and the second gate driver GDR2, and various kinds of electricity supply terminals P-PAD1, P-PAD2, P-PAD3 are arranged. Each of the above input terminals corresponds to the above pad, and will be explained as an input pad or an electricity supply pad in the following description.

An output terminal of an unillustrated flexible printed board, i.e., a pad is connected to each of the above input pads DDM, GDM1, GDM2 of this driving circuit mounting area BR, and the various kinds of electricity supply pads P-PAD1, P-PAD2, P-PAD3. The drain driver DDR and the two gate drivers (the first gate driver GDR1 and the second gate driver GDR2) are so-called integrated circuits, and are not only limited to chips, but also include a material in which these drivers are directly made on the substrate.

Many data lines DL extending in the longitudinal direction (the vertical direction set to a first direction) of the first display substrate SUB1 in FIG. 7 and arranged in parallel in the transversal direction (the leftward and rightward direction set to a second direction) are arranged in the display area of the first display substrate SUB1, and are connected to the drain driver DDR mounted to the driving circuit mounting area BR. In the display area AR of the first display substrate SUB1, many gate lines GL (GL1, GL2) extending in its leftward and rightward direction and arranged in parallel in the vertical direction are similarly formed. The gate line is vertically divided into two groups GL1 and GL2 with respect to the display area AR. The respective groups are mounted to the driving circuit mounting area BR by gate line drawing-around wirings GLL1, GLL2, and are connected to gate drivers GDR1, GDR2 arranged so as to operate the above two gate line groups.

In the display area AR, many thin film transistors are arranged as switching elements every pixel formed in each crossing portion of the data line DL and the gate line GL (GL1, GL2), but are not shown in the drawings. A pixel electrode is also arranged every pixel forming each thin film transistor therein, but is not also shown in the drawings.

An opposite electrode opposed to the above pixel electrode is formed on the inner face of the second display substrate SUB2. In the case of color display, a color filter of plural colors is arranged in an upper layer or a lower layer of this opposite electrode, but its illustration is omitted together with the opposite electrode. The opposite electrode is connected to the electricity supply pads P-PAD1, P-PAD3 arranged in the driving circuit mounting area BR through opposite electrode connecting pads C-PAD1, C-PAD2 arranged in an upper side corner portion of the first display substrate SUB1 and common lines B1, B2.

In this liquid crystal display device, a storage line STL is formed between the gate lines GL (GL1, GL2) of the first display substrate SUB1. This storage line STL is vertically divided into two groups with respect to the display area AR of the first display substrate SUB1. The lower side group is connected to the electricity supply pad P-PAD2 arranged in the driving circuit mounting area BR by the common line B3 on the left-hand side. The upper side group is connected to the electricity supply pad P-PAD3 arranged in the driving circuit mounting area BR by the common line B2 on the right-hand side.

Electricity is supplied to the storage line STL by the electricity supply pads P-PAD2 and P-PAD3. Since the opposite electrode connecting pads C-PAD1 and C-PAD2 are connected to each other by the opposite electrode, it can be also said that electricity is supplied to the storage line STL by the opposite electrode connecting pads C-PAD1, C-PAD2 and P-PAD1. Electricity is sufficiently supplied to the storage line even when disconnection or an increase in resistance is caused in one of the common lines B1, B2.

In such a construction, there is no portion in which the storage line STL and the gate line GL cross on the plane of the substrate. Accordingly, the storage line STL and the gate line GL can be formed in the same layer, and mutually have no riding-across portion. Therefore, it is not necessary to consider the generation of a defect in disconnection. Further, the storage line STL and the gate line GL are formed in the same layer. Accordingly, when these lines are patterned by using an aluminum material, the formation of an anode for avoiding its hillock generation can be performed by one process so that there is no increase in manufacture process. Further, each wiring including a drawing-around wiring is symmetrically arranged on the left-hand and right-hand sides of the display area AR. Therefore, the display area AR can be arranged at the center of the liquid crystal display device.

Figure 8:
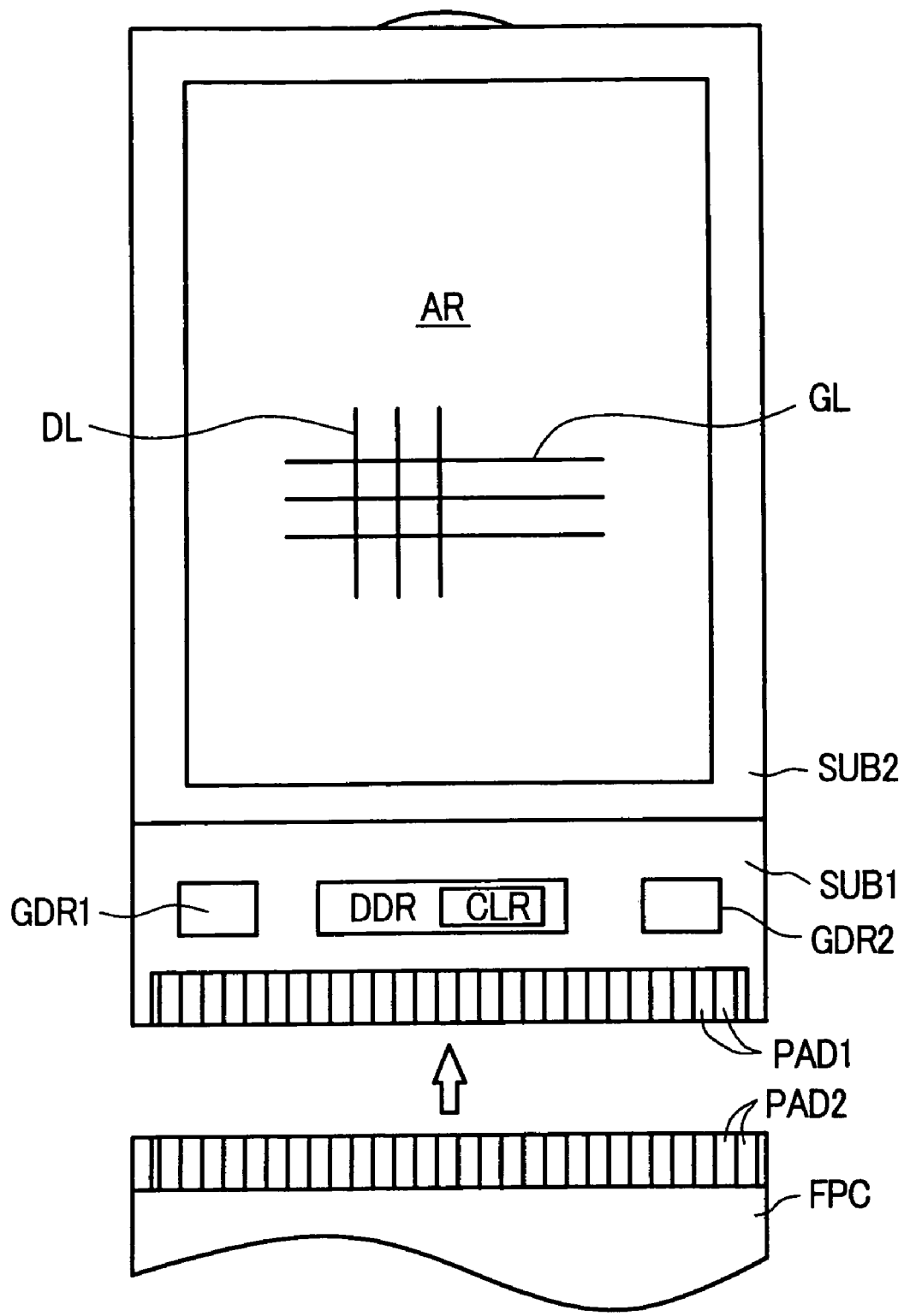
FIG. 8 is a plan view for explaining a constructional example of the liquid crystal display device used in a portable telephone set as a typical application example of the display device of the present invention.
Figure 9:
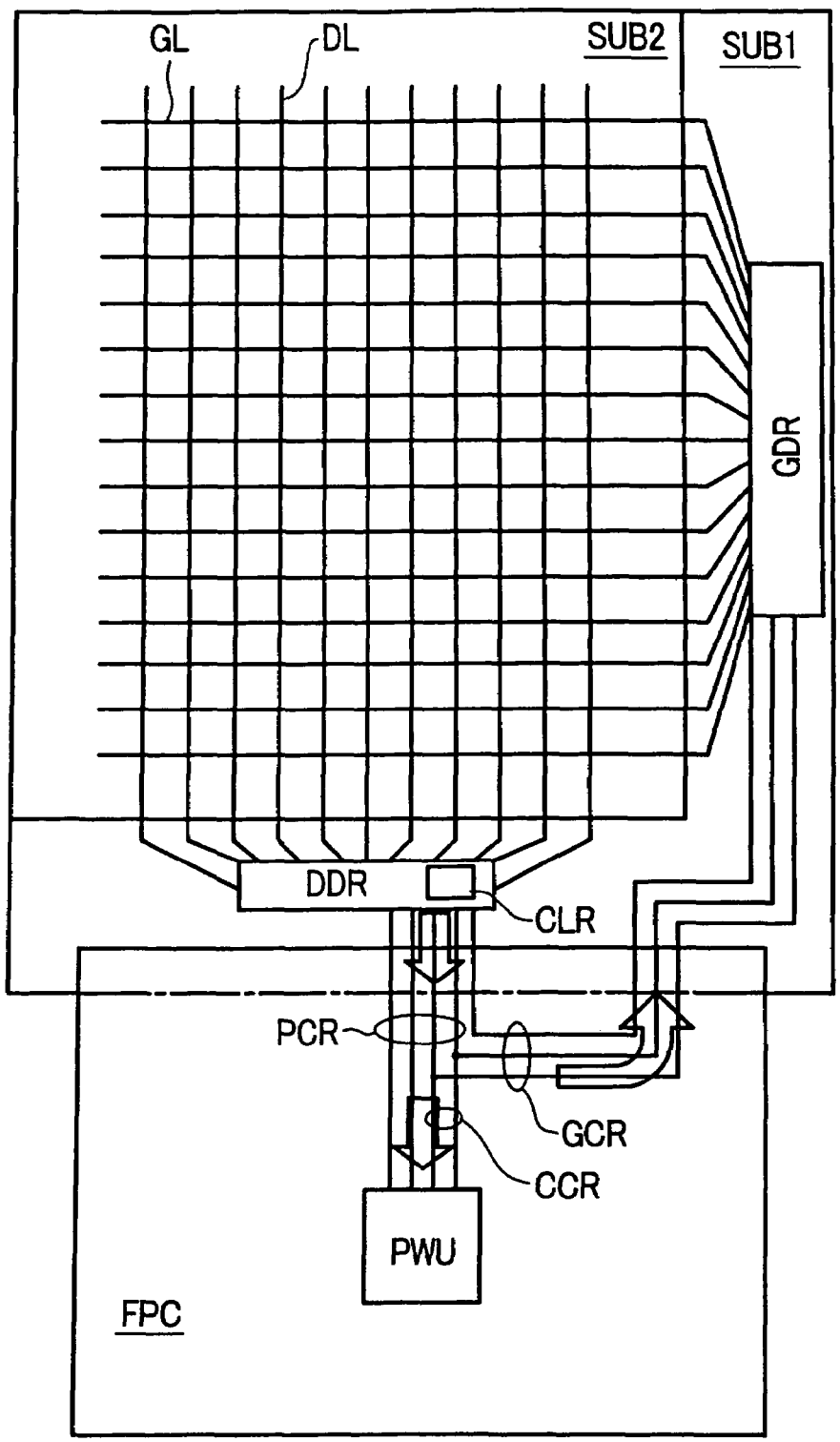
FIG. 9 is a typical view for explaining one example of the wiring structure of the liquid crystal display device.

FIG. 8 is a plan view for explaining, a constructional example of the liquid crystal display device used in a portable telephone set as a typical application example of the display device of the present invention. This liquid crystal display device has the construction explained in each of the above embodiments and FIG. 7, and the display area AR is located in the central portion.

The drain driver DDR having the controller CLR therein and the gate drivers GDR1, GDR2 are mounted to the driving circuit mounting area arranged on one side of the first display substrate SUB1. Many pads PAD1 for supplying signals and voltages to the drain driver DDR, the gate drivers GDR1, GDR2, an opposite electrode arranged in the second display substrate SUB2, etc. are formed at the lower end of the driving circuit mounting area of the first display substrate SUB1.

A pad PAD2 of the flexible printed board FPC is connected to this pad PAD1. The above signals and voltages are supplied from an external signal processing circuit through the flexible printed board FPC. An unillustrated power source is mounted to the flexible printed board FPC, and is bent on the rear face of the liquid crystal display device, and is integrated with this rear face. In FIGS. 6A-6C, the drain driver DDR and the two gate drivers GDR1, GDR2 are mounted to the driving circuit mounting area, but the gate driver can be also set to one semiconductor chip.

The present invention is not limited to the above compact liquid crystal display device and other compact display devices, but can be also similarly applied to a notebook personal computer, a desk top computer, and other comparatively large-sized display devices. Further, in the display device requiring illumination light, the present invention can be also applied to the display device of any one of a transmission type, a reflection type, a partial transmission type, a semi-transmission type, etc.

In the above description, the display device of the active matrix system is explained, but the present invention can be also applied to mounting and wiring processing of a driving circuit chip in the display device of a simple matrix system, a display device using a thin film diode as a switching element, and various kinds of display devices of organic EL, plasma, FED and others. Further, these substrates are not limited to glass and a glass system, but a resin plate can be used in accordance with the kind of the display device.

As explained above, in accordance with the present invention, the control signal wiring between the drain driver mounted to the substrate and the power source (power circuit chip) connected through the gate driver and the flexible printed board is directly formed on the substrate of the display device. Therefore, it is possible to provide the display device in which the construction of the flexible printed board can be simplified, and the number of pads for connecting both is reduced. Accordingly, the entire display device can be made compact and can be reduced in cost.

What is claimed is:

1. A display device comprising:
a display substrate having a plurality of pixels,
a first IC chip and a second IC chip arranged on said display substrate,
a flexible printed board connected to said display substrate, and
a third IC chip arranged outside said display substrate;
wherein said first IC chip has an output terminal for outputting a common control signal commonly used in control of said second IC chip and said third IC chip;
said display substrate has a wiring divided and pulled out in two directions in the place of said output terminal of said common control signal; and
said common control signal is drawn around and inputted to said second IC chip by said wiring on said display substrate, and is inputted to said third IC chip through said wiring on said display substrate and a wiring on said flexible printed board.

2. A display device according to claim 1, wherein one wiring of said wiring divided and pulled out in two directions in the place of said output terminal of said common control signal passes below said first IC chip, and is pulled out by passing a side different from the arranging side of said output terminal of said first IC chip.

3. A display device according to claim 2, wherein said one wiring is connected to said second IC chip.

4. A display device according to claim 2, wherein said one wiring is connected to said third IC chip through said flexible printed board.

5. A display device according to claim 2, wherein said one wiring is pulled out via a dummy terminal.

6. A display device according to claim 1, wherein said common control signal is two or more signals.

7. A display device according to claim 1, wherein said first IC chip is a drain driver having a controller; and
said second IC chip is a gate driver.

8. A display device according to claim 1, wherein said display device is a liquid crystal display device.

9. A display device comprising:
a display substrate having a plurality of pixels,
a first IC chip and a second IC chip arranged on said display substrate,
a flexible printed board connected to said display substrate, and
a third IC chip arranged outside said display substrate;
wherein said first IC chip has an output terminal for outputting a common control signal commonly used in control of said second IC chip and said third IC chip, and has a dummy terminal arranged on a side adjacent to the arranging side of said output terminal; and
said second IC chip has an input terminal for inputting said common control signal, and has a dummy terminal arranged on a side adjacent to the arranging side of said input terminal.

10. A display device according to claim 9, wherein said dummy terminal of said first IC chip is arranged on a short side of said first IC chip, and said dummy terminal of said second IC chip is arranged on a long side of said second IC chip.

11. A display device according to claim 9, wherein said dummy terminal of said first IC chip is arranged on a short side of said first IC chip, and said dummy terminal of said second IC chip is arranged on a short side of second IC chip.

12. A display device according to claim 9, wherein said dummy terminal of said first IC chip is arranged on a long side of said first IC chip, and said dummy terminal of said second IC chip is arranged on a long side of said second IC chip.

13. A display device according to claim 9, wherein said dummy terminal of said first IC chip is arranged on a long side of said first IC chip, and said dummy terminal of said second IC chip is arranged on a short side of said second IC chip.

14. A display device according to claim 9, wherein said common control signal is wired at least once via said dummy terminal of said fist IC chip or said second IC chip.

15. A display device according to claim 9, wherein said common control signal is drawn around and inputted to said second IC chip by a wiring on said display substrate, and is inputted to said third IC chip through a wiring on said display substrate and a wiring on said flexible printed board.

16. A display device according to claim 9, wherein said common control signal is two or more signals.

17. A display device according to claim 9, wherein said first IC chip is a drain driver having a controller; and said second IC chip is a gate driver.

18. A display device according to claim 9, wherein said display device is a liquid crystal display device.

* * * * *